United States Patent [19]

Michaud

[11] Patent Number: 6,057,874
[45] Date of Patent: May 2, 2000

[54] INFRARED BLASTER CONTROL SYSTEM IN CABLE TELEVISION COMMUNICATION SYSTEMS

[75] Inventor: Ted Richard Michaud, Medford, N.J.

[73] Assignee: General Instrument Corporation, Horsham, Pa.

[21] Appl. No.: 08/752,791

[22] Filed: Nov. 21, 1996

[51] Int. Cl.$^7$ .................................................. H04N 7/10
[52] U.S. Cl. ................ 348/6; 348/10; 348/460; 348/465; 348/477; 348/734; 455/4.1
[58] Field of Search .................... 348/10, 6, 7, 8, 348/5, 460, 473, 478, 465, 474, 477, 906, 734; 455/6.2, 3.1, 4.1, 5.1, 6.1

[56] References Cited

U.S. PATENT DOCUMENTS

| | | | |
|---|---|---|---|
| 4,894,714 | 1/1990 | Christis | 358/86 |
| 5,065,235 | 11/1991 | Iijima | 455/4.1 |
| 5,223,923 | 6/1993 | Morales-Garza | 358/84 |
| 5,285,272 | 2/1994 | Bradley et al. | 348/6 |
| 5,341,166 | 8/1994 | Garr et al. | 348/10 |
| 5,410,326 | 4/1995 | Goldstein | 348/134 |
| 5,412,416 | 5/1995 | Nemirofsky | 348/10 |
| 5,414,756 | 5/1995 | Levine | 379/67 |
| 5,414,773 | 5/1995 | Handelman | 380/49 |
| 5,479,202 | 12/1995 | Beriont | 348/7 |
| 5,483,277 | 1/1996 | Granger | 348/6 |
| 5,485,221 | 1/1996 | Banker et al. | 348/563 |
| 5,512,936 | 4/1996 | Burton et al. | 348/11 |
| 5,526,127 | 6/1996 | Yonetani et al. | 348/906 |
| 5,550,642 | 8/1996 | Kim et al. | 348/734 |
| 5,657,414 | 8/1997 | Lett et al. | 348/734 |
| 5,659,368 | 8/1997 | Landis | 348/467 |

FOREIGN PATENT DOCUMENTS

WO9417632  8/1994  WIPO ..................... H04N 5/782

*Primary Examiner*—John K. Peng
*Assistant Examiner*—Linus H. Lo
*Attorney, Agent, or Firm*—Volpe and Koenig, P.C.

[57] ABSTRACT

A system for delivering selective VCR control codes to programmable settop terminals over a CATV communication system includes a headend for storing and transmitting VCR control code information to the settop terminals and a plurality of settop terminals for receiving the control codes. The CATV communication system delivers the VCR control codes to individual subscribers within the vertical blanking interval of one of the broadcast channels or over a control data channel. A set-up procedure is required for each VCR to determine the appropriate set of VCR control codes. Upon determining the specific type of VCR the subscriber has, the VCR control codes transmitted through the CATV system are stored in the settop terminal in non-volatile memory. Since the settop terminal only stores the VCR control codes for a single type of VCR, memory requirements are minimized.

16 Claims, 9 Drawing Sheets

FIG. 4

TV SET

PLEASE SELECT FROM AMONG THE FOLLOWING CHOICES.

1) SETUP NEW VCR

2) RECORD NEW PROGRAM

3) OTHER

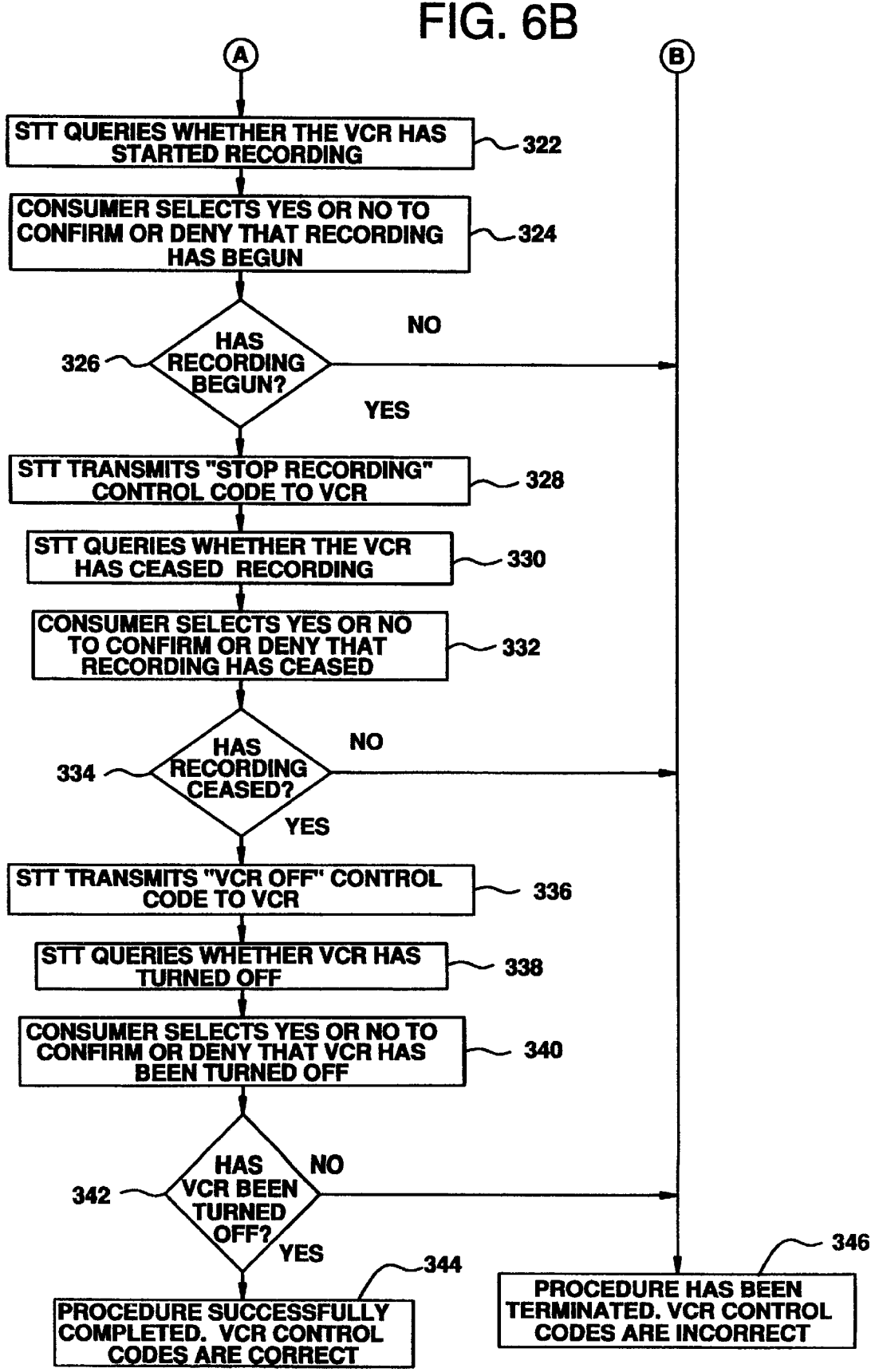

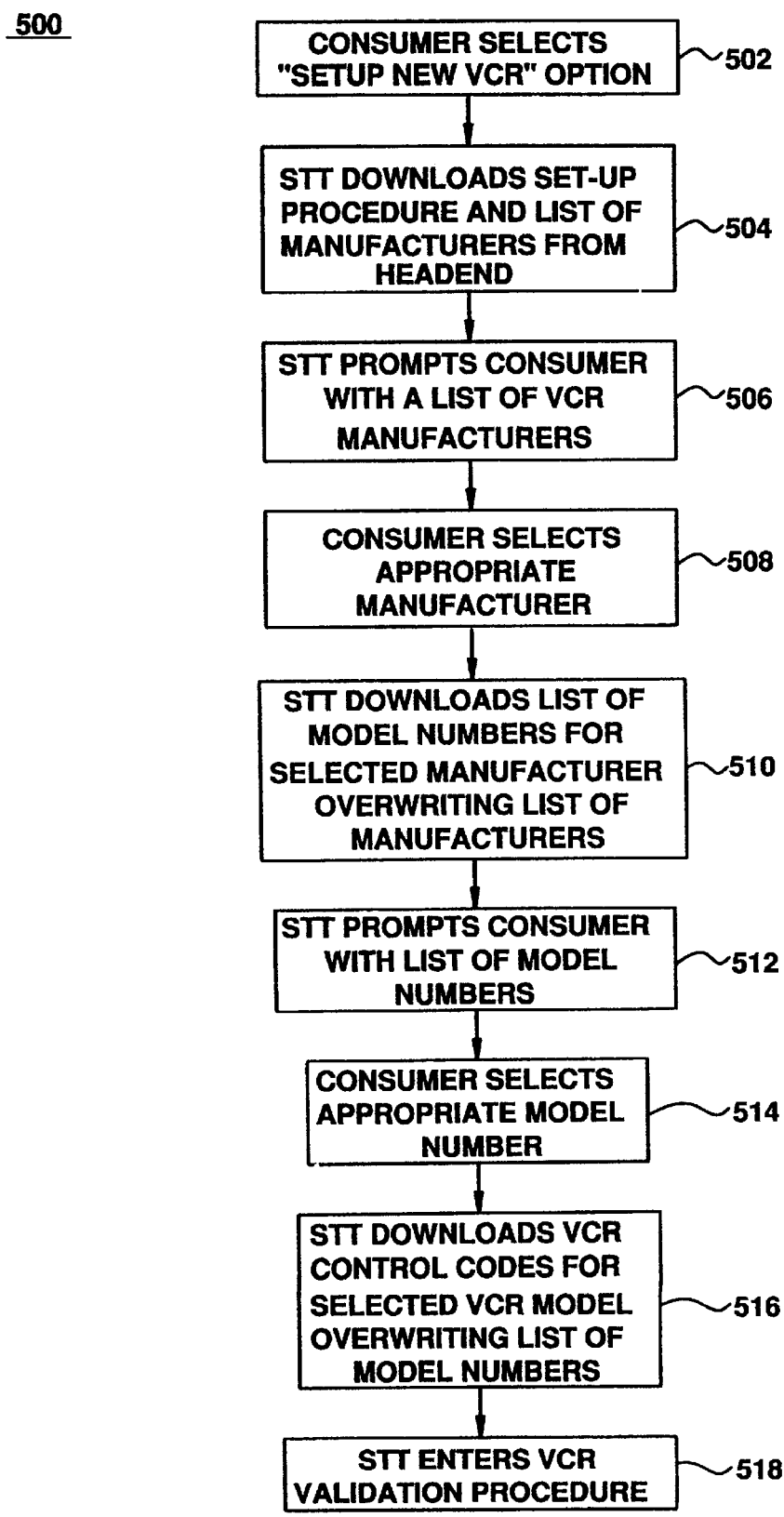

INFRARED BLASTER CONTROL SYSTEM IN CABLE TELEVISION COMMUNICATION SYSTEMS

BACKGROUND OF THE INVENTION

1. Field of the Invention

This invention relates generally to cable television (CATV) communications systems. More specifically, the invention pertains to a system and method for delivering selective infrared blaster VCR control codes to settop terminals over a CATV communication network.

2. Description of Related Art

CATV operators typically provide their consumers with a settop terminal, which is the interface between the CATV communication network and the consumer's television. Although most of today's televisions and VCRs are "cable ready" and have broadband tuners able to tune to the entire CATV spectrum, settop terminals are still required for a consumer to access all of the services offered by the CATV provider. Settop terminals are used to descramble premium service channels, enable viewing of pay-per-view events and facilitate interactive communications with the headend of the CATV communication system.

The use of settop terminals, however, creates difficulties for many consumers and often results in frustration for consumers due to the inconvenience of using the settop terminals in conjunction with a consumer's other home entertainment devices. For example, in order for a consumer to use their VCR to record a program being transmitted over the CATV system, the consumer must typically coordinate the settings of the VCR, the television and the settop terminal. If any of these components are not set correctly, i.e. turned on and tuned to the correct channel, the attempt at recording the program will be unsuccessful. The consumer is also faced with utilizing three different remote controls; one for the settop terminal, one for the VCR and one for the television. This can be very frustrating and confusing for consumers.

Manufacturers of CATV settop terminals have attempted to simplify the coordination of these electronic components and ease the burden on consumers by providing settop terminals which directly control a VCR. This is typically performed by incorporating an infrared (IR) blaster, essentially an IR transmitter, into the settop terminal which transmits control instructions from the settop terminal to the VCR. The level of complexity for the consumer is substantially reduced since only the settop terminal must be controlled. Using a single IR remote control, the consumer can switch television channels, program the VCR and perform many other tasks in a simplified manner.

There are several drawbacks to current settop terminals which include an IR blaster. One of the primary drawbacks is that there are many different types of VCRs and a correspondingly large number of different control codes. To be compatible with all VCRs, each settop terminal must include a library of VCR control codes for all VCRs. This requires a large memory within the settop terminal to store a database of all VCR control codes. Since the price of memory is a large percentage of the cost of a settop terminal, a large memory directly contributes to the increased costs of a settop terminal. It has become imperative to reduce the amount of required memory in order to reduce the overall costs of settop terminals.

A second drawback to current settop terminals is that the database of VCR control codes is static. After the settop terminal is manufactured and the memory programmed, the data is fixed as of that date. The information becomes obsolete as new VCRs with different control codes are manufactured. A settop terminal will be unable to control VCRs which utilize new or different VCR control codes manufactured after the programming of the settop terminal.

Accordingly, there exists the need for a settop terminal which efficiently utilizes memory and which includes a dynamic VCR control code database.

SUMMARY OF THE INVENTION

The present invention is a system and method of delivering selective VCR control codes to programmable settop terminals over a CATV communication system. The CATV communication system delivers the VCR control codes to individual subscribers through their settop terminals. A set-up procedure is required for each VCR to determine the appropriate set of VCR control codes. Upon determining the specific type of VCR the subscriber has, the VCR control codes transmitted through the CATV system are stored in the settop terminal in non-volatile memory. Since the settop terminal only stores the VCR control codes for a single type of VCR, the memory requirements are minimized.

Accordingly, it is an object of the present invention to provide a CATV settop terminal which efficiently utilizes memory by receiving VCR control codes over a CATV communication network.

Other objects and advantages of the invention will become apparent to those skilled in the art after reading the detailed description of a presently preferred embodiment.

BRIEF DESCRIPTION OF THE DRAWINGS

FIG. 4 is the graphical user interface;

FIGS. 6A and 6B are flow diagrams of the VCR validation procedure;

FIG. 8 is a flow diagram of an alternative embodiment of the settop terminal initialization procedure.

DETAILED DESCRIPTION OF THE PREFERRED EMBODIMENT

Figure 1:
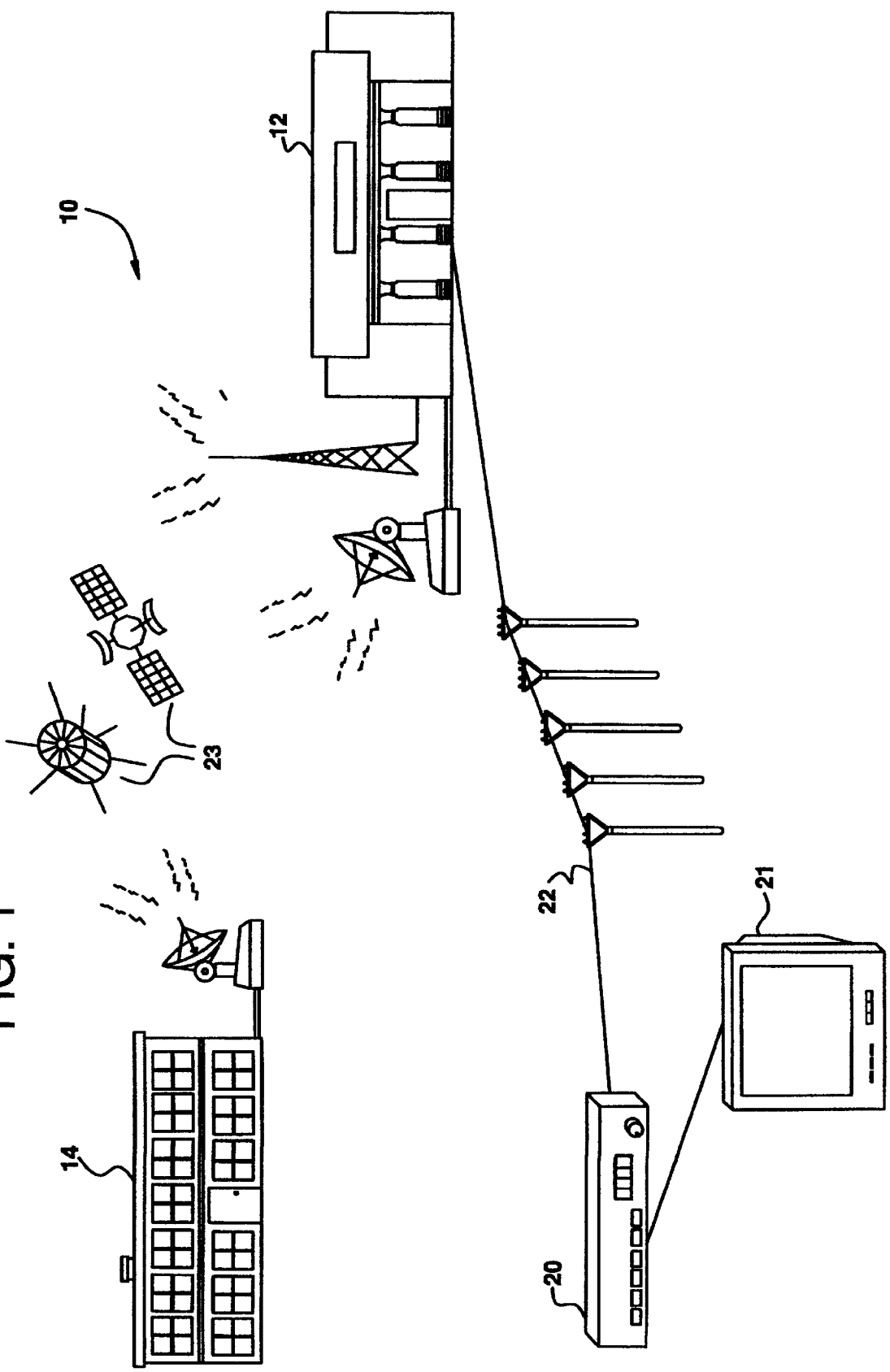
FIG. 1 is a simplified view of a CATV transmission network.

The preferred embodiment will be described with reference to the drawing figures wherein like numerals represent like elements throughout.

A CATV communication system 10 embodying the present invention is shown in FIG. 1. The communication system 10 comprises one or more information providers 14 which communicate via satellite uplinks 23 with a plurality of headends 12. Each headend 12, in turn, communicates with a plurality of settop terminals 20 which are located in the home of a consumer. The settop terminal 20 receives transmissions from the headend 12 through the CATV transmission network 22. The transmission network 22 may comprise a standard coaxial network, a hybrid fiber-coax network or a "wireless cable" network employing microwave antennas and receivers. The settop terminal 20 provides the interface between the consumer's television 21 and the communication system 10.

Figure 2:
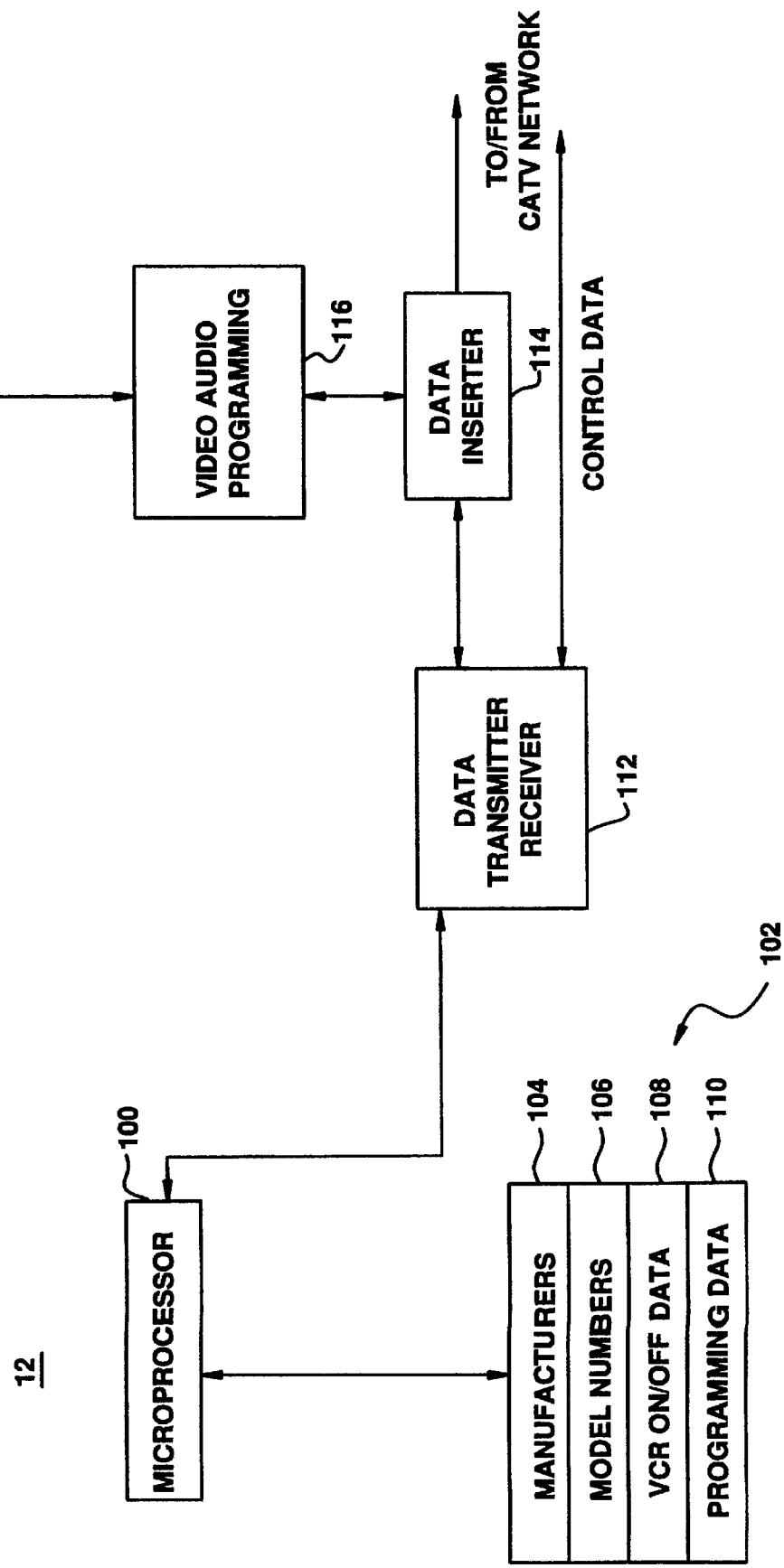
FIG. 2 is a headend made in accordance with the teachings of the present invention.

Referring to FIG. 2, a headend 12 made in accordance with the teachings of the present invention is shown. The headend 12 receives video, audio and data content from remote service providers 14 and retransmits this information over the CATV transmission network 22 in a manner that is well known to those of skill in the art. The headend 12 may also be the origination source of local program content. It should be apparent to those skilled in the art that the headend 12 of a CATV system includes many components which are outside the scope of this invention. The foregoing description will only include a detailed description of the components relevant to the present invention.

In accordance with the present invention, the headend 12 includes a microprocessor 100 which is coupled to an electronic storage device 102 such as a PC hard drive, or any other suitable type of memory, and a data transceiver 112. The storage device 102 includes a database of information related to all VCRs including manufacturers 104, model numbers 106 and the corresponding VCR control codes 108, 110. The data transceiver 112 is further coupled with a data inserter 114 which combines the data with the video audio and data content 116 for transmission to consumers over the CATV network 22. The database of VCR information is continually or periodically updated by downloading current data into via a modem (not shown) or a floppy disk.

Figure 3:
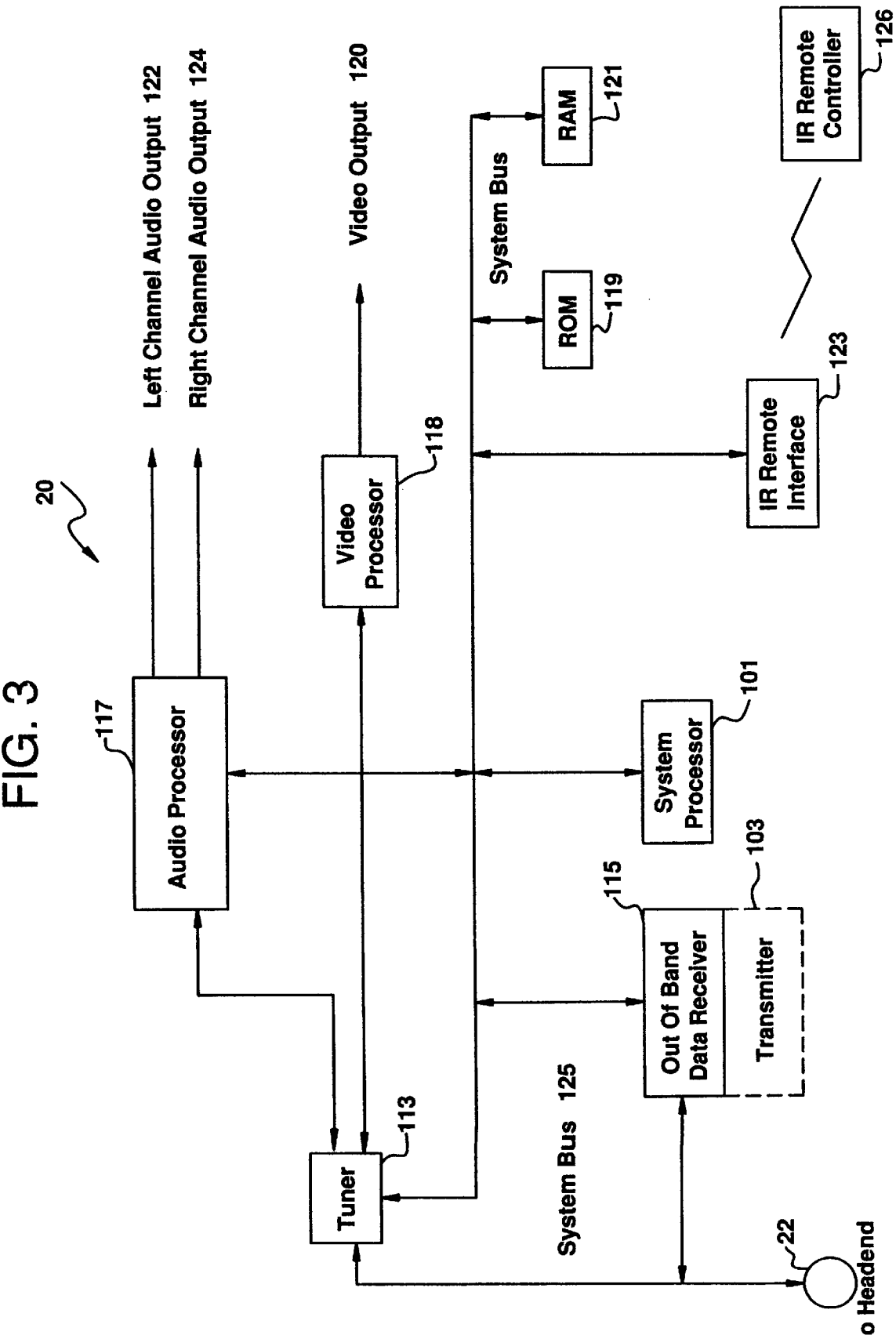
FIG. 3 is a settop terminal made in accordance with the teachings of the present invention.

Referring to FIG. 3, a settop terminal 20 made in accordance with the present invention is shown. The settop terminal 20 includes a system processor 101, a tuner 113, a data receiver 115, video and audio processors 117, 118, two types of memory 119, 121 and an IR remote interface 123. A system bus 125 facilitates communications between components within the settop terminal 20.

The data receiver 115 provides a data interface between the control system processor 101 and the CATV headend 12. The data receiver 115 receives out-of-band downstream data transmissions over a data-only channel, typically known as the control data channel (CDC), from the headend 12. Optionally, the data receiver 115 may be coupled with a data transmitter 103 which permits transmission of communications upstream from the settop terminal 20 to the headend 12 if interactive communications are desired.

The system processor 101 provides overall control of the settop terminal 20. The system processor 101 receives start up functions from the read only memory (ROM) 119 upon power-up and stores data, control information, and any executable instructions or programs sent from the headend 12 in the random access memory (RAM) 121. As will be explained in detail hereinafter, control information from the headend 12 includes the VCR control codes which are stored in RAM 121.

The tuner 113 is responsive to the frequency of the channel selected by the consumer to remove the carrier signal. Audio and video content is processed through the audio processor 117 and the video processor 118, respectively, in a manner which is well known to those skilled in the art. The baseband video signal is typically placed on a second carrier frequency corresponding to television channels 3 or 4 to provide a video output 120. Left and right channel audio outputs 122, 124 are also provided for input into a stereo (not shown) or the audio inputs of a consumer's television 21, if so equipped.

Data is transmitted from the headend 12 to the settop terminal 20 in the following manner. The headend 12 continuously transmits the entire database of information relating to VCR manufacturers 104, model numbers 106, control data 108 and programming data 110 in a repeating data stream. Preferably, the data stream is inserted by the data inserter 14 within lines 20 or 22 of the vertical blanking interval (VBI) of programs transmitted over a specific broadcast channel. The settop terminal 20 extracts the data from the VBI for further processing as will be described in detail hereinafter. Alternatively, the data may be transmitted within the VBI of all broadcast channels, or over the out-of-band CDC channel. When the CDC is utilized to transmit the VCR control codes information, the data receiver 115 extracts the data for further processing.

A consumer utilizes the system of the present invention upon initial installation of the VCR. Operation of the settop terminal 20 is simplified through the use of a graphical user interface (GUI) which displays all of the available choices on the television screen and prompts the consumer to select among the available choices as shown in FIG. 4. The use and operation of GUIs are well known to those of skill in the art. The consumer scrolls through the available choices by using the IR remote controller 126, and makes a selection using the buttons on the IR remote controller 126. Alternatively, choices may be input using a touchpad (not shown) located externally on the settop terminal 20. If a consumer desires to initialize the settop terminal 20 for a new VCR or reinstall the program for an existing VCR, option 1 must be selected.

Figure 5:
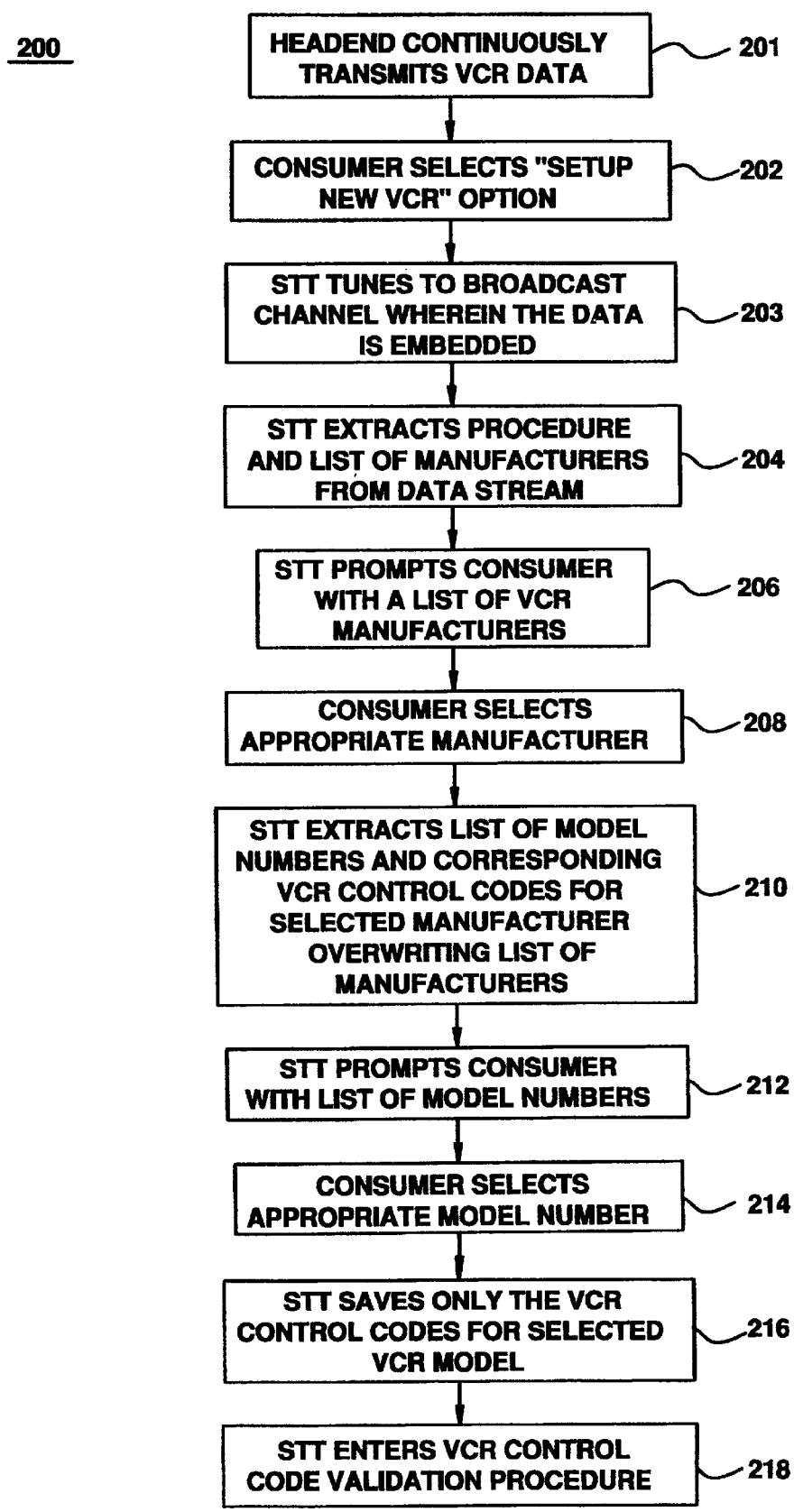
FIG. 5 is a flow diagram of the preferred embodiment of the settop terminal initialization procedure.

Referring to FIG. 5, the procedure 200 for setting up the settop terminal 20 for a specific VCR in accordance with the preferred embodiment of the present invention is shown. As the headend 12 continuously transmits the VCR control codes (step 201), the consumer selects the "SET-UP NEW VCR" option from the main option menu shown in FIG. 4 (step 202). The settop terminal 20 must then access the VCR data stream. If the data is embedded within the VBI, the settop terminal 20 tunes to the broadcast channel wherein the data is embedded (step 203). The settop terminal 20 then extracts the set-up procedure and the list of manufacturers from the data stream (step 204). The set-up procedure is a routine that the settop terminal 20 implements in order to download the VCR control codes 108, 110. After this information has been downloaded into RAM 121, the settop terminal 20 displays a list of VCR manufacturers 104 and prompts the consumer to select the manufacturer of the consumer's VCR (step 206). The consumer selects the appropriate manufacturer (step 208) and the settop terminal 20 extracts, from the data stream, the list of model numbers 106 and corresponding VCR control codes 108, 110 for the manufacturer selected by the consumer (step 210). Since the list of manufacturers 104 is no longer needed, the list of model numbers 106 and corresponding VCR control codes 108, 110 overwrites the manufacturer information, thus conserving the amount of required RAM 121. The list of model numbers 106 is displayed tc the consumer and the consumer is prompted by the settop terminal 20 to select the appropriate model number for their VCR (step 212). The consumer selects the appropriate model number (step 214) and the settop terminal 20 saves only the VCR control codes 108, 110 for the selected VCR model number (step 216).

The settop terminal 20 enters a VCR control code validation procedure (step 218) which confirms that the consumer has selected the proper manufacturer and model number for their VCR. This will be explained in detail hereinafter with reference to FIGS. 6A and 6B. If the consumer does not know the model number of their VCR, the consumer may select the first choice and enter the VCR validation procedure (step 218) to determine if their selection is correct. If the selection is incorrect, the consumer may return to step 212 and select one of the other available choices for that manufacturer. Although this method may be cumbersome, it provides an option for consumers who are unable to locate the model number.

In a first alternative embodiment, which further conserves the amount of required RAM 121 and ROM 119, the list of manufacturers 104 and model numbers 106 may be extracted by the settop terminal 20 in smaller groups. For example, the first ten manufacturers 104 may be loaded into RAM 121. When the consumer confirms that the displayed list of VCR manufacturers 104 does not include the manufacturer of their VCR, the next ten manufacturers 104 are then extracted and loaded into RAM 107. The model numbers 106 may also be extracted in small groups and treated in the same manner.

In a second alternative embodiment, the settop terminal 20 may simply prompt the consumer to input the manufacturer 104 and model number 106, thus eliminating the need for a lengthy procedure to extract the manufacturer 104 and model number 106 information.

Figure 6A:
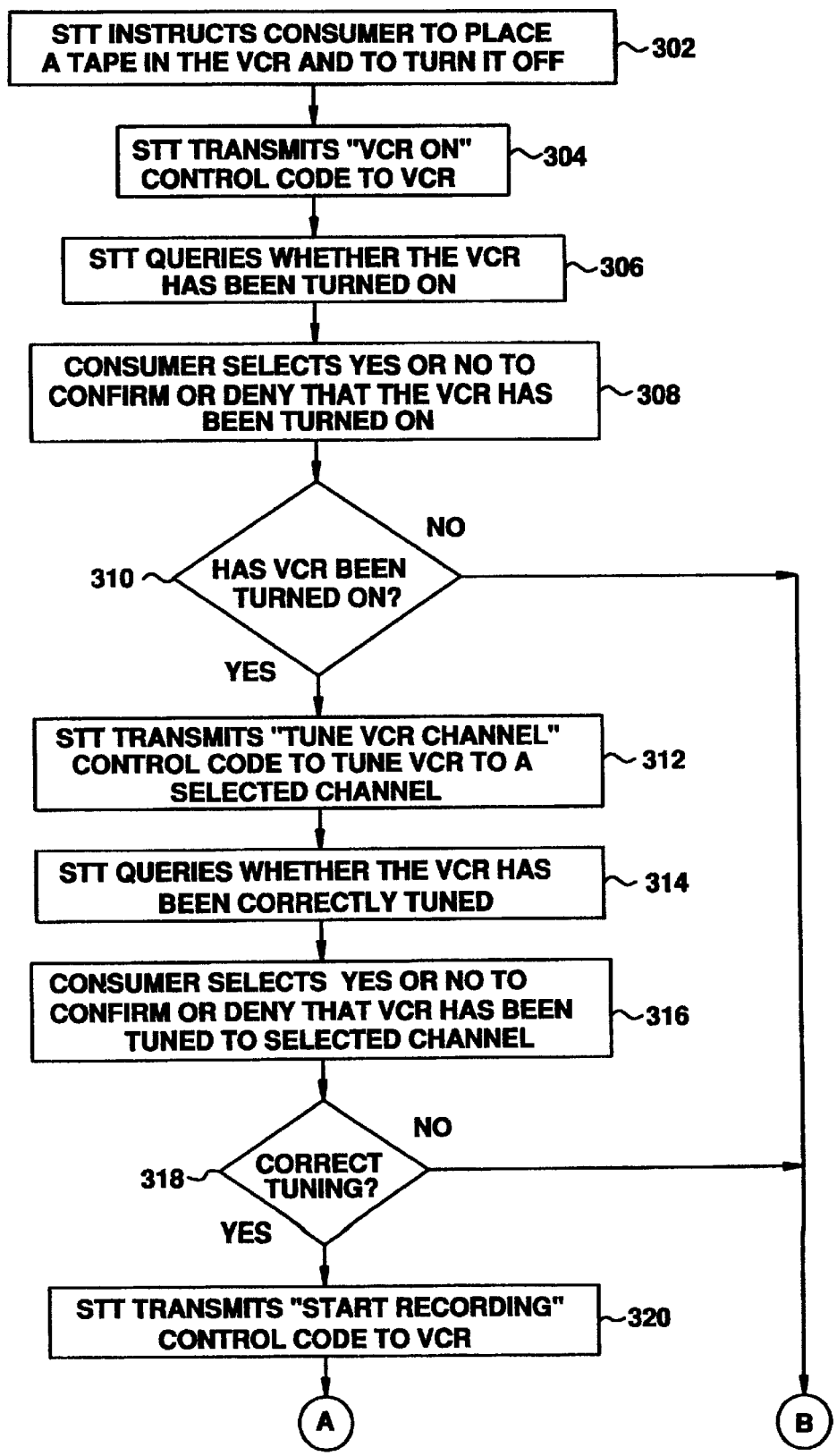

Referring to FIGS. 6A and 6B, the procedure (step 300) for validating the VCR control codes 108, 110 in accordance with the present invention is shown. The settop terminal 20 first instructs the consumer to insert a tape into the VCR and turn the VCR off (step 302). The settop terminal 20 transmits the "VCR ON" control code to the VCR (step 304). The settop terminal 20 queries whether the VCR has been turned on (step 306) and the consumer selects YES or NO to confirm or deny that the VCR has been turned on (step 308). If YES has been selected (step 310); the settop terminal 20 transmits a "TUNE VCR CHANNEL" control code to tune the VCR to a selected channel (step 312). The settop terminal 20 queries whether the VCR has been correctly tuned (step 314) and the consumer selects YES or NO to confirm or deny that the VCR has been tuned to the selected channel (step 316). If YES has been selected (step 318), the settop terminal 20 transmits a "START RECORDING" control code to the VCR (step 320). The settop terminal 20 queries whether the VCR has started recording (step 322) and the consumer selects YES or NO to confirm or deny that recording has begun (step 324). If YES has been selected (step 326), the settop terminal 20 transmits a "STOP RECORDING" control code to the VCR (step 328). The settop terminal 20 queries whether the VCR has ceased recording (step 330) and the consumer again selects YES or NO to confirm or deny that recording has ceased (step 332). If YES has been selected (step 334), the settop terminal 20 transmits a "VCR OFF" control code to the VCR (step 336). The settop terminal 20 queries whether the VCR has turned off (step 338) and the consumer selects YES or NO to confirm or deny that the VCR has been turned off (step 340). If YES has been selected, the procedure has been successfully completed and VCR control codes are correct (step 344). If the consumer selects NO in response to any query, (steps 310, 318, 326, 334 and 342), the procedure is terminated (step 346) since the VCR control codes are incorrect for the particular VCR being installed are incorrect. If the consumer notes that the VCR has not performed each designated task, the consumer must return to the main selection menu and reset-up the VCR.

Figure 7:
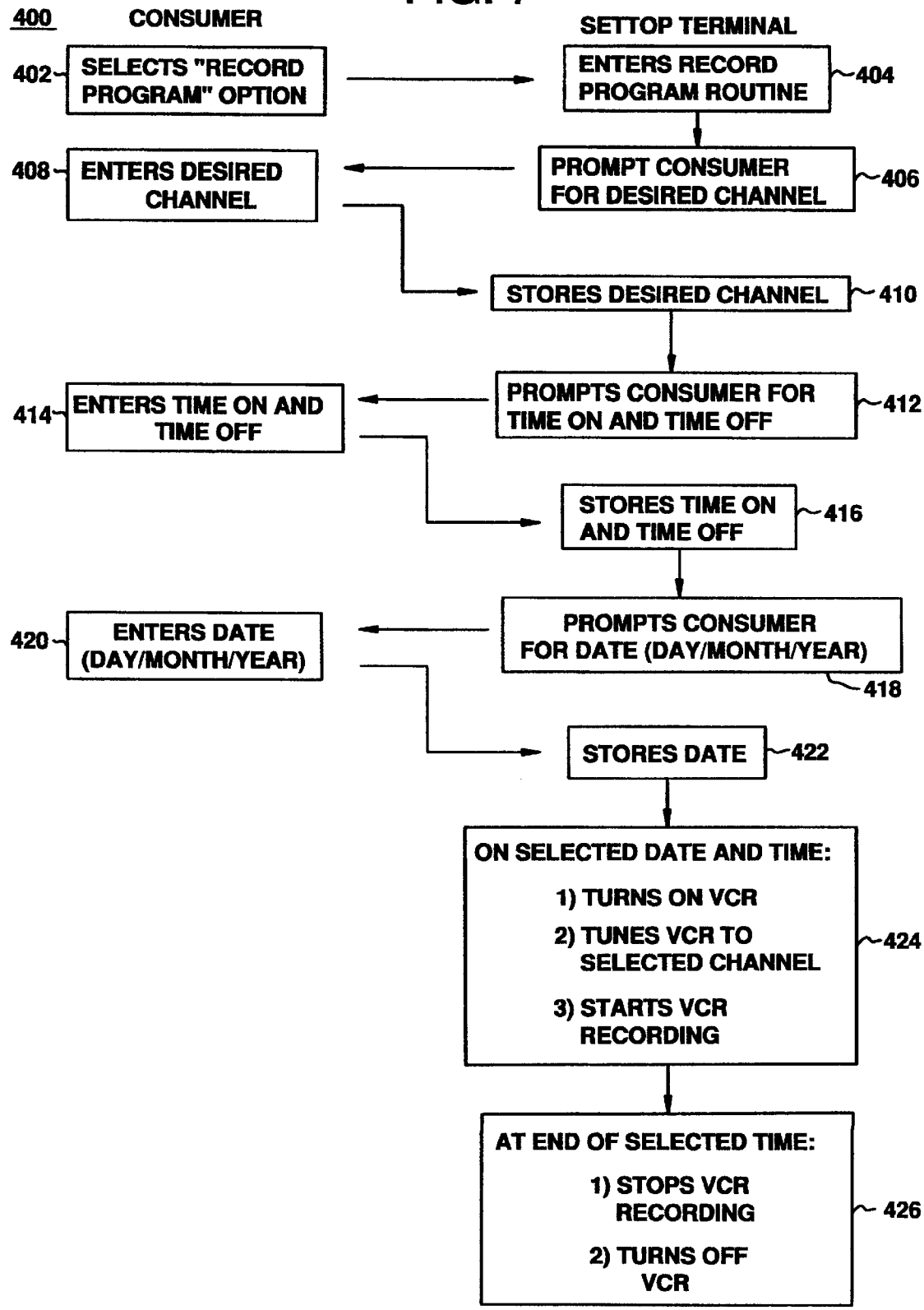
FIG. 7 is a flow diagram of the VCR program procedure.

In accordance with the present invention, the settop terminal 20 and VCR are properly coordinated to record any programs selected by the consumer. The procedure for recording a program utilizing the settop terminal 20 (step 400) is shown in FIG. 7. The consumer selects the "RECORD PROGRAM" option on the main selection menu as shown in FIG. 4 (step 402). The settop terminal 20 enters the record program routine (step 404) and prompts the consumer for the desired channel (step 406). The consumer enters the desired channel (step 408) and this channel is stored in the settop terminal 20 (step 410). The settop terminal 20 then prompts the consumer for time-on and time-off data (step 412) which the consumer enters (step 414) and the settop terminal 20 stores (step 416). The settop terminal 20 then prompts the consumer for the date of the desired recording (step 418). The consumer enters the date (step 420) and the settop terminal 20 stores the date (step 422). From this point, the tasks performed by the settop terminal 20 are transparent to the consumer. On the selected date and time, the settop terminal 20 turns on the VCR, tunes the VCR to the selected channel and starts the VCR recording (step 424). At the end of the selected time, the settop terminal 20 stops the VCR recording and turns off the VCR (step 426).

The aforementioned embodiments may be implemented using a unidirectional CATV communication network, wherein communications are transmitted only from the headend 12 to the settop terminal 20. In a third alternative embodiment, an interactive system utilizes the bidirectional CATV communication network 22. In this embodiment, the microprocessor 100 within the headend 12 comprises an interactive server which responds to information requests by the settop terminal 20 and the data receiver 115 within the settop terminal 20 is coupled with a data transmitter.

Referring to FIG. 8, the procedure 500 for interactively setting up the settop terminal 20 for a specific VCR in accordance with the third alternative embodiment of the present invention is shown. The consumer selects the "SET-UP NEW VCR" option from the main option menu shown in FIG. 4 (step 502). The settop terminal 20 requests a download of the set-up procedure and the list of manufacturers from the headend 12 (step 504). This information is transmitted to the requesting settop terminal 20 via an addressable data stream, either within the VBI or the CDC. After the information is downloaded into RAM 121, the settop terminal 20 displays a list of VCR manufacturers 104 and prompts the consumer to select the manufacturer of the consumer's VCR (step 506). The consumer selects the appropriate manufacturer (step 508) and the settop terminal 20 requests the headend 12 to download the list of model numbers 106 for the manufacturer selected by the consumer step 510). Since the list of manufacturers 104 is no longer needed, the list of model numbers 106 overwrites the list of manufacturers 104, thus conserving the amount of required RAM 121. The list of model numbers 106 is displayed to the consumer and the consumer is prompted by the settop terminal 20 to select the appropriate model number for their VCR (step 512). The consumer selects the appropriate model number (step 514) and the settop terminal 20 requests the headend 12 to download the VCR control codes 108, 110 for the selected VCR model number (step 516). Again, the VCR control codes 108, 110 overwrite the list of model numbers 106 which is no longer needed. The settop terminal 20 then enters a VCR validation procedure (step 518) which confirms that the consumer has input the proper manufacturer and model number for their VCR. This procedure was explained with reference to FIGS. 6A and 6B. This interactive embodiment is particularly suited for situations wherein it is desirable to minimize the amount of data being downloaded over the CATV communication network 22 since the data is only transmitted from the headend 12 upon request of the settop terminal 20.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A system for providing VCR control codes to a VCR over a CATV communication system including a headend and at least one settop terminal, comprising:

a headend comprising:

means for storing a set of VCR control codes for a plurality of different VCRs; and means for transmitting at least a subset of said set of VCR control codes over said CATV communication system; and a settop terminal comprising:

means for selecting and downloading a first subset of said transmitted VCR control codes;

means for storing said first subset in memory; and means for testing said first subset to determine whether said selected subset correctly pertains to said VCR; wherein said selecting and downloading means selects and downloads a second subset of said transmitted VCR control codes and overwrites said first subset if said testing means determines that said first subset does not correctly pertain to said VCR.

2. The system of claim 1 wherein said transmitting means comprises a data transmitter for inserting said VCR control codes within the vertical blanking interval of a broadcast channel; and said receiving means comprises a tuner for selectively tuning to said broadcast channel and reading said VCR control codes embedded within the vertical blanking interval.

3. The system of claim 2 wherein said testing means comprises means for transmitting said selected VCR control codes to a VCR.

4. The system of claim 2 wherein said settop terminal further includes means for transmitting to said headend a selection signal based upon said selection; and said headend further includes means for receiving said selection signal.

5. The system of claim 4 wherein said headend includes means for accessing information in response to said received selection signal and means for transmitting said accessed information to a settop terminal.

6. The system of claim 1 wherein said headend further includes means for transmitting said plurality of VCR control codes over a data channel.

7. The system of claim 6 wherein said settop terminal further includes means for receiving said plurality of VCR control codes over said data channel.

8. A settop terminal for use in a system which provides VCR control codes over a CATV communication system, the system including a headend having means for storing a set of VCR control codes for a plurality of different VCRs and means for transmitting at least a subset of said set of VCR control codes over said CATV communication system; the settop terminal comprising:

means for selecting and downloading a first subset of said transmitted VCR control codes;

means for storing said first subset in memory; and means for testing said first subset to determine whether said selected subset correctly pertains to said VCR; wherein said selecting and downloading means selects and downloads a second subset of said transmitted VCR control codes and overwrites said first subset if said testing means determines that said first subset does not correctly pertain to said VCR.

9. The settop terminal of claim 8 wherein said VCR control codes are transmitted within the vertical blanking interval of a broadcast channel and said settop terminal receiving means comprises a tuner for selectively tuning to said broadcast channel and reading said VCR control codes embedded within the vertical blanking interval.

10. The settop terminal of claim 9 wherein said settop terminal further comprises means for transmitting said stored VCR control codes to a VCR.

11. The settop terminal of claim 9 wherein said settop terminal further comprises means for transmitting a selection signal, based upon said selection, to said headend.

12. The settop terminal of claim 8 wherein said VCR control codes are transmitted over a data channel and said settop terminal further comprises means for receiving said plurality of VCR control codes over said data channel.

13. A method for providing VCR control codes to a VCR over a CATV communication system including a headend and at least one settop terminal, the method comprising the steps of:

at said headend:

a) storing a plurality of VCR control codes for a plurality of different VCRs; and b) transmitting at least a subset of said plurality of VCR control codes over said CATV communication system; and, at said settop terminal:

c) selecting and downloading a first subset of said transmitted VCR control codes;

d) storing said first subset in memory e) testing said first subset by transmitting one of the VCR control codes within said first subset to the VCR to initiate a VCR function, and verifying that said VCR function has occurred; and f) repeating step e until all VCR control codes within said first subset have been verified.

14. The method of claim 13 wherein said transmitting step comprises inserting said VCR control codes within the vertical blanking interval of a broadcast channel.

15. The method of claim 13 further comprising transmitting said stored VCR control codes to a VCR.

16. The method of claim 13 wherein said transmitting step comprises transmitting said plurality VCR control codes over a data channel.

* * * * *